(12) United States Patent
Du et al.

(10) Patent No.: US 10,914,889 B2
(45) Date of Patent: Feb. 9, 2021

(54) BACKLIGHT MODULE AND DISPLAY DEVICE

(71) Applicants: BOE Technology Group Co., Ltd., Beijing (CN); Chengdu BOE Optoelectronics Technology Co., Ltd., Chengdu (CN)

(72) Inventors: Yu Du, Beijing (CN); Suimang Song, Beijing (CN); Yifan Li, Beijing (CN); Min Liu, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 378 days.

(21) Appl. No.: 15/773,014

(22) PCT Filed: Sep. 28, 2017

(86) PCT No.: PCT/CN2017/104041
§ 371 (c)(1),
(2) Date: May 2, 2018

(87) PCT Pub. No.: WO2018/176772
PCT Pub. Date: Oct. 4, 2018

(65) Prior Publication Data
US 2020/0257039 A1    Aug. 13, 2020

(30) Foreign Application Priority Data
Mar. 30, 2017 (CN) .................... 2017 2 0328698 U

(51) Int. Cl.
*G02F 1/13357* (2006.01)
*F21V 8/00* (2006.01)

(52) U.S. Cl.
CPC ......... *G02B 6/0091* (2013.01); *G02B 6/0085* (2013.01); *G02B 6/0088* (2013.01)

(58) Field of Classification Search
CPC .. G02B 6/0091; G02B 6/0085; G02B 6/0088; G02F 2001/133314; G02F 2001/133317
(Continued)

(56) References Cited

U.S. PATENT DOCUMENTS

| 2011/0043721 A1 | 2/2011 | Hwang et al. |
| 2011/0069510 A1* | 3/2011 | Yamashita ........... G02B 6/0085 362/612 |

(Continued)

FOREIGN PATENT DOCUMENTS

| CN | 102661550 A | 9/2012 |
| CN | 103090275 A | 5/2013 |

(Continued)

OTHER PUBLICATIONS

PCT/CN2017/1040401 International Search Report dated Jan. 4, 2018.

*Primary Examiner* — Karabi Guharay
(74) *Attorney, Agent, or Firm* — Arent Fox LLP; Michael Fainberg

(57) ABSTRACT

Disclosed herein are a backlight module and a display device. The backlight module includes: a light guide plate, a light source assembly located on a first surface of the light guide plate, and a support bracket configured to support the light guide plate and the light source assembly; wherein the support bracket further includes an installation portion for fixing the light source assembly, and an elastic element arranged on the installation portion configured to adjust a gap between the light source assembly and the first surface of the light guide plate to a first distance.

20 Claims, 3 Drawing Sheets

(58) Field of Classification Search
USPC .......................................................... 362/611
See application file for complete search history.

(56) References Cited

U.S. PATENT DOCUMENTS

| | | |
|---|---|---|
| 2013/0301297 A1 | 11/2013 | Hsiao et al. |
| 2016/0299287 A1 | 10/2016 | Li et al. |

FOREIGN PATENT DOCUMENTS

| | | |
|---|---|---|
| CN | 104075192 A | 10/2014 |
| CN | 204187413 U | 4/2015 |
| CN | 104748017 A | 7/2015 |

* cited by examiner

BACKLIGHT MODULE AND DISPLAY DEVICE

This application is a National Stage of International Application No. PCT/CN2017/104041, filed Sep. 28, 2017, which claims priority to Chinese Patent Application No. 201720328698.9, filed Mar. 30, 2017, both of which are hereby incorporated by reference in their entireties.

TECHNICAL FIELD

Embodiments of this disclosure relate to the field of display technologies, and particularly to a backlight module and a display device.

BACKGROUND

As automobile industries and particularly household cars are being popularized, increasingly advanced on-vehicle displays have been required, and they have transitioned from a traditional pointer display to a Liquid Crystal Display (LCD) with a digital and image display function. An increasingly advanced display module is required for a sophisticated structure and a complicated environment of an automobile, and a good design of the module is significantly important to the popularization and development of the on-vehicle display technologies.

And how to maintain a stable gap between an LED lamp group, and a light incidence surface of a light guide plate is of great importance.

SUMMARY

At least one embodiment of the disclosure provides a backlight module including a light guide plate, a light source assembly located on a first surface of the light guide plate, and a support bracket configured to support the light guide plate and the light source assembly, wherein: the support bracket further includes an installation portion for fixing the light source assembly, and an elastic element arranged on the installation portion configured to adjust a gap between the light source assembly and the first surface of the light guide plate to a first distance.

In some embodiments of the disclosure, the support bracket further includes a side plate with a threaded hole arranged thereon; the installation portion includes a sliding post, and a convex plate located on one end of the sliding post, wherein a thread is arranged on a sidewall of the convex plate to be matched with the threaded hole; and the light source assembly includes an installation base configured to fix a lamp strip, wherein the elastic element has one end abutting against the convex plate, and the other end abutting against the installation base.

In some embodiments of the disclosure, an opening is arranged on the support bracket to allow the light source assembly to pass therethrough.

In some embodiments of the disclosure, the installation base further includes: a first installation plate, wherein the lamp strip is installed on one side of the first installation plate, and an installation groove is arranged on the other side of the first installation plate to be slidably matched with the sliding post; and a second installation plate arranged perpendicular to the first installation plate, wherein the second installation plate is inserted into the opening, and fit onto a surface of the support bracket facing away from the light guide plate.

In some embodiments of the disclosure, the support bracket further includes a base plate, wherein the opening is arranged on the base plate, a part of the base plate fit onto the second installation plate is bent towards a second surface of the light guide plate to form a bend area for accommodating the second installation plate, and a surface of the second installation plate facing away from the second surface of the light guide plate is flush with a surface of an unbent part of the base plate facing away from the second surface of the light guide plate, or closer to the second surface of the light guide plate than the unbent part of the base plate.

In some embodiments of the disclosure, a support protrusion is arranged between the first surface of the light guide plate and the lamp strip to define a distance between the lamp strip, and the first surface of the light guide plate.

In some embodiments of the disclosure, there are two support protrusions, wherein the two support protrusions are formed integral with the light guide plate, and a recessed section for accommodating a plurality of light emitting bodies on the lamp strip is formed between the two support protrusions.

In some embodiments of the disclosure, there are two support protrusions, wherein the two support protrusions are arranged on the lamp strip and between any two light emitting bodies on the lamp strip.

In some embodiments of the disclosure, the support bracket further includes: a top plate arranged opposite to the base plate to absorb or reflect light rays of the lamp strip irradiated thereon.

In some embodiments of the disclosure, a heat dissipation structure is arranged on the installation base.

In some embodiments of the disclosure, there is a heat conduction tape arranged between the lamp strip and the installation base.

At least one embodiment of the disclosure provides a display device including a display panel, and the backlight module according to any one of the technical solutions above.

BRIEF DESCRIPTION OF THE DRAWINGS

In order to make the technical solutions according to the embodiments of the disclosure more apparent, the drawings to which reference is made in the description of the embodiments will be introduced briefly, and apparently the drawings to be described below are only some embodiments of the disclosure, and those ordinarily skilled in the art can further derive other drawings from these drawings here without any inventive effort.

DETAILED DESCRIPTION OF THE EMBODIMENTS

In order to make the objects, technical solutions, and advantages of the embodiments of the disclosure more apparent, the technical solutions according to the embodiments of the disclosure will be described below clearly and fully with reference to the drawings in the embodiments of the disclosure. Apparently the embodiments to be described are only a part but not all of the embodiments of the disclosure. Based upon the embodiments here of the disclosure, all of other embodiments which can occur to those ordinarily skilled in the art without any inventive effort shall come into the scope of the disclosure as claimed.

In a backlight module of an on-vehicle display device in the related art, some gap needs to be reserved between the LED lamp group, and the light incidence surface of the light guide plate due to thermal expansion and cold contraction of the light guide plate, but the gap may affect the optical performance, such as brightness, uniformity, etc., of the entire backlight module.

Figure 1:
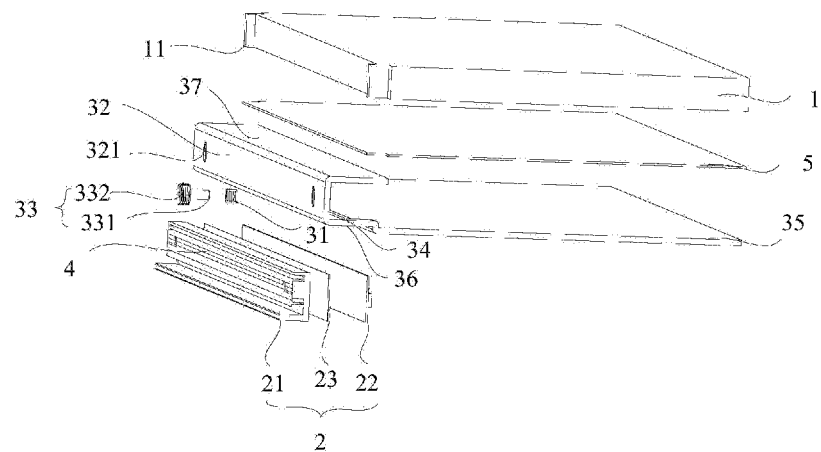
FIG. 1 is an exploded view of a backlight module according to embodiments of the disclosure.
Figure 2:
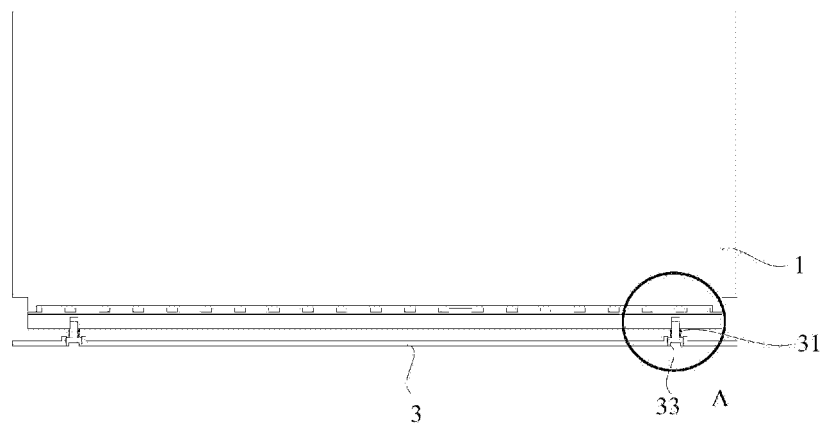
FIG. 2 is a schematic state diagram of the backlight module according to the embodiments of the disclosure.
Figure 3:
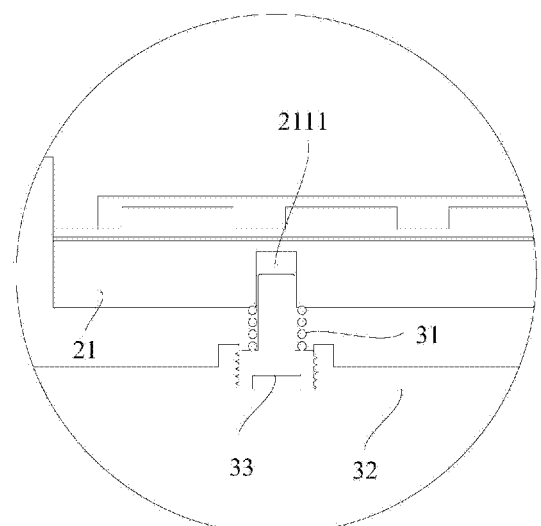
FIG. 3 is an enlarged view of a section A in FIG. 2.

As illustrated in FIG. 1, FIG. 2 and FIG. 3, embodiments of the disclosure provide a backlight module including: a light guide plate 1, a light source assembly 2 located on a first surface of the light guide plate 1, and a support bracket 3 configured to support the light guide plate 1 and the light source assembly 2; where the support bracket 3 includes an installation portion 33 for fixing the light source assembly 2, and an elastic element 31 arranged on the installation portion 33 configured to adjust a gap between the light source assembly 2 and the first surface of the light guide plate 1 to a first distance. Where the first surface can be any surface of the light guide plate 1; and when a relative position of the light source assembly 2 and the light guide plate 1 is determined, the first surface where the light source assembly 2 is located is generally referred to as a light incidence surface of the light guide plate 1.

In the backlight module according to the embodiments of the disclosure, the elastic element 31 is arranged on the installation portion 33 of the support bracket 3 so that the first distance can be maintained between the light source assembly 2 and the light guide plate 1 due to the elasticity of the elastic element 31; where when the light guide plate 1 expands, the elastic element 31 is shortened, and the light source assembly 2 is pushed away from the light guide plate 1 as a whole; and when the light guide plate 1 contracts, the elastic element 31 is elongated, and the light source assembly 2 is pushed towards the light guide plate 1 as a whole, so the gap between the first surface of the light guide plate 1 and the light source assembly 2 can be maintained no matter whether the light guide plate 1 expands or contracts.

Accordingly the backlight module according to the embodiments of the disclosure can improve the stability of the gap between the light source assembly and the first surface of the light guide plate, and thus the optical stability.

The first distance above generally refers to a distance between a light emitting surface of the light source assembly and the first surface of the light guide plate, where the light emitting surface refers to a plane of an emergent side of a light emitting body in the light source assembly.

The elastic element 31 above can be a spring, or another elastically deformable structure. Typically the backlight module further includes: a reflection sheet 5 located on a side of the light guide plate 1 facing away from a second surface thereof, and an optical film 6 located on the second surface of the light guide plate 1. Where the second surface is generally referred to as a light emitting surface of the light guide plate 1.

In the embodiments of the disclosure, the support bracket 3 will not be limited to any particular structural form, and in an optional implementation, as illustrated in FIG. 1, the support bracket 3 includes a side plate 32 with a threaded hole 321 arranged thereon.

The installation portion 33 includes: a sliding post 331 and a convex plate 332 located on one end of the sliding post 331, where a thread is arranged on a sidewall of the convex plate 332 to be matched with the threaded hole 321.

The light source assembly 2 includes: an installation base 21 configured to fix a lamp strip 22, where the elastic element 31 has one end abutting against the convex plate 332, and the other end abutting against the installation base 21. When the support bracket 3 and the light source assembly 2 are assembled together, the sliding post 331 is threaded through the threaded hole 321 arranged on the side plate of the support bracket 3, and the sliding post 331 is fixedly connected with the convex plate 332, so when the convex plate 332 is rotated, the length of the elastic element 31 located between the installation base 21 and the convex plate 332 can be adjusted so that the constant distance between the light source assembly 2 and the first surface of the light guide plate 1 can be maintained after the installation base 21 is fixed on the support bracket 3.

The structure above can enable respective components to be stabilized under a vibration condition, to thereby improve the optical stability.

The support bracket above can be a sheet metal component, and the installation base can be a heat dissipation aluminum extrusion component.

In order to install and remove the light source assembly 2 conveniently, an opening 34 is arranged on the support bracket 3 according to the embodiments to allow the light source assembly 2 to pass therethrough, as illustrated in FIG. 1. When the light source assembly 2 is installed or removed, the light source assembly 2 can be put into the support bracket 3 through the opening 34, or taken out of the opening 34, so that a manpower cost can be lowered while guaranteeing the precision of installation.

Figure 4:
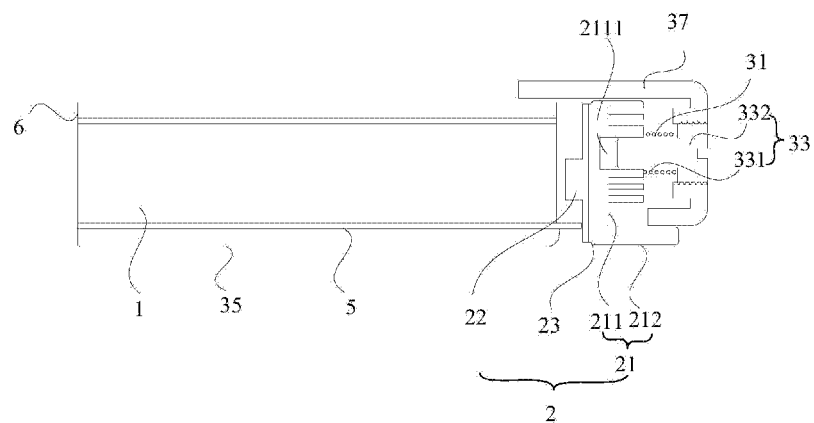
FIG. 4 is another schematic state diagram of the backlight module according to the embodiments of the disclosure.

There may be a number of particular structures of the installation base 21 above, and optionally as illustrated in FIG. 1 and FIG. 4, the installation base 21 includes: a first installation plate 211, where the lamp strip 22 is installed on one side of the first installation plate 211, and an installation groove 2111 is arranged on the other side of the first installation plate to be slidably matched with the sliding post 331, where the installation groove 2111 is arranged to facilitate better fixed connection of the installation base 21 with the support bracket 3; and a second installation plate 212 arranged perpendicular to the first installation plate 211, where the second installation plate 212 is inserted into the opening 34, and fit onto a surface of the support bracket 3 facing away from the light guide plate 1. The second installation plate 212 can have the installation base 21 clamped and fixed into the opening 34 arranged on the support bracket.

As illustrated in FIG. 1, the support bracket 3 includes a base plate 35, where the opening 34 is arranged on the base plate 35, a part of the base plate 35 fit onto the second installation plate 212 is bent towards the second surface of the light guide plate 1 to form a bend area 36 for accommodating the second installation plate 212, and a surface of the second installation plate 212 facing away from the second surface of the light guide plate 1 is flush with a surface of an unbent part of the base plate 35 facing away from the second surface of the light guide plate 1, or closer to the second surface of the light guide plate 1 than the unbent part of the base plate 35. With this design, the overall thickness of the backlight module can be reduced to thereby reduce the thickness of the display device.

The lamp strip generally includes a lamp panel, and a plurality of LED lamps located on the lamp panel, and as illustrated in FIG. 1, in order to further improve the stability of the gap between the lamp strip and the first surface of the light guide plate 1, a support protrusion 11 is arranged between the first surface of the light guide plate 1 and the lamp strip to define a distance between the lamp strip, and the first surface of the light guide plate 1. The height of the protrusion can be determined according to the set distance above, and typically the height of the protrusion is equal to a length of the set distance.

The particular number of the support protrusion 11 above can be set by those skilled in the art as needed in practical. Optionally there are two support protrusions 11, where the two support protrusions 11 are formed integral with the light guide plate 1, and a recessed section for accommodating a plurality of light emitting bodies is formed between the two support protrusions 11.

Alternatively the two support protrusions 11 are arranged on the lamp strip and between any two light emitting bodies on the lamp strip. That is, the support protrusion(s) 11 can be located on the light guide plate 1, or can be located on the lamp strip, and since the light guide plate 1 tends to be deformed due to an environmental factor, the support protrusion(s) 11 is (or are) arranged on the lamp strip.

As illustrated in FIG. 1 and FIG. 4, the support bracket 3 further includes: a top plate 37 arranged opposite to the base plate 35 to absorb or reflect light rays of the lamp strip irradiated thereon. The utilization ratio of light of the light source assembly 2 in the backlight module can be thus improved.

In an optional embodiment, a heat dissipation structure 4 is arranged on the installation base 21.

In an optional embodiment, there is a heat conduction tape 23 arranged between the lamp strip and the installation base 21. This structural design can speed up heat conduction between the lamp strip and the installation base, and thus speed up dissipation of the heat so as to alleviate the light source assembly 2 from being damaged.

The heat dissipation structure 4 above can be a heat dissipation hole, a heat dissipation mesh structure, etc.

Figure 5:
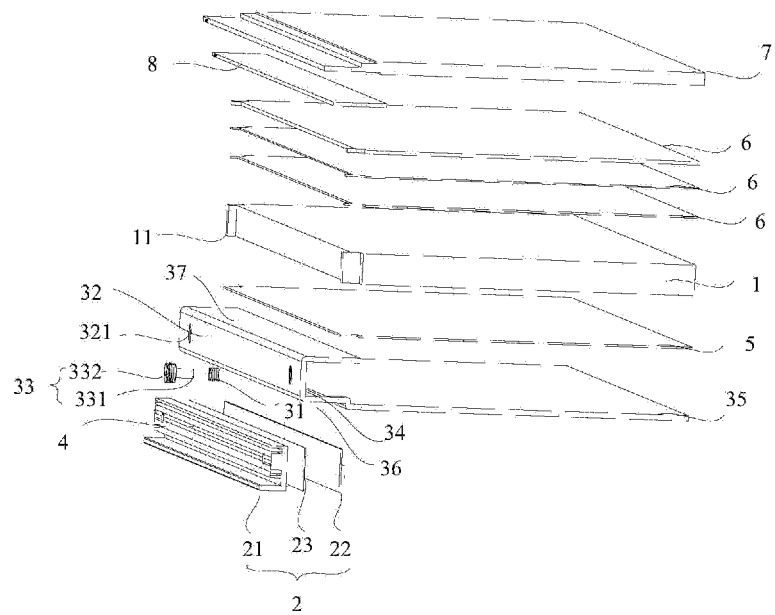
FIG. 5 is an exploded view of a display device according to the embodiments of the disclosure.
Figure 6:
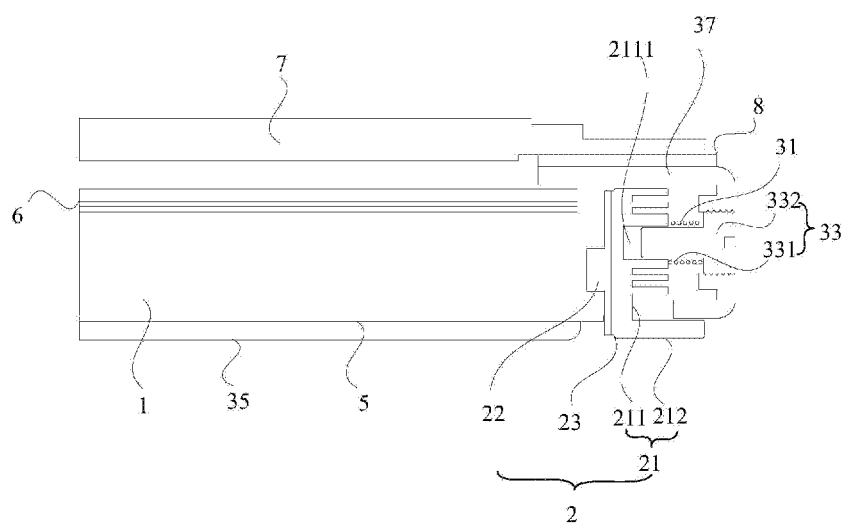
FIG. 6 is a schematic state diagram of the display device according to the embodiments of the disclosure.

As illustrated in FIG. 5 and FIG. 6, the embodiments of the disclosure further provide a display device including a display panel 7, and the backlight module according to any one of the embodiments above. Since the backlight module can improve the stability of the gap between the surface of the lamp strip and the first surface of the light guide plate 1 to thereby further improve the optical stability, there is a better display effect of the display panel 7 in the embodiments of the disclosure.

The display panel 7 above is generally fixedly connected with the backlight module using a fixed tape 8.

The display device according to the embodiments of the disclosure can be any one of a mobile phone, a tablet computer, electronic paper, and a digital photo frame.

It shall be lastly noted that the foregoing embodiments are merely intended to illustrate the technical solutions according to the disclosure, but not intended to limit the disclosure thereto; and although the disclosure has been described in details in connection with the foregoing embodiments thereof, those ordinarily skilled in the art shall appreciate that they still can modify the technical solutions recited in the respective embodiments above, or make equivalent substitutions for a part of the technical features therein; and the essences of the corresponding technical solutions will not depart from the spirit and scope of the respective embodiments of the disclosure due to these modifications or substitutions.

The invention claimed is:

1. A backlight module, comprising:
   a light guide plate;
   a light source assembly located on a first surface of the light guide plate;
   a support bracket configured to support the light guide plate and the light source assembly, wherein:
   the support bracket further comprises:
   an installation portion for fixing the light source assembly; and
   an elastic element arranged on the installation portion configured to adjust a gap between the light source assembly and the first surface of the light guide plate to a first distance;
   wherein the support bracket further comprises a side plate with a threaded hole arranged thereon;
   the installation portion comprises:
   a sliding post; and
   a convex plate located on one end of the sliding post;
   wherein a thread is arranged on a sidewall of the convex plate to be matched with the threaded hole; and
   the light source assembly comprises:
   an installation base configured to fix a lamp strip;
   wherein the elastic element has one end abutting against the convex plate, and the other end abutting against the installation base.

2. The backlight module according to claim 1, wherein an opening is arranged on the support bracket to allow the light source assembly to pass therethrough.

3. The backlight module according to claim 2, wherein the installation base further comprises:
   a first installation plate, wherein the lamp strip is installed on one side of the first installation plate, and
   an installation groove is arranged on the other side of the first installation plate to be slidably matched with the sliding post; and
   a second installation plate arranged perpendicular to the first installation plate;
   wherein the second installation plate is inserted into the opening, and fit onto a surface of the support bracket facing away from the light guide plate.

4. The backlight module according to claim 3, wherein the support bracket further comprises:
   a base plate, wherein the opening is arranged on the base plate, a part of the base plate fit onto the second installation plate is bent towards a second surface of the light guide plate to form a bend area for accommodating the second installation plate, and
   a surface of the second installation plate facing away from the second surface of the light guide plate is flush with a surface of an unbent part of the base plate facing away from the second surface of the light guide plate, or closer to the second surface of the light guide plate than the unbent part of the base plate.

5. The backlight module according to claim 4, wherein the support bracket further comprises:
   a top plate arranged opposite to the base plate to absorb or reflect light rays of the lamp strip irradiated thereon.

6. The backlight module according to claim 1, wherein a heat dissipation structure is arranged on the installation base.

7. The backlight module according to claim 6, wherein there is a heat conduction tape arranged between the lamp strip and the installation base.

8. The backlight module according to claim 1, wherein a support protrusion is arranged between the first surface of the light guide plate and the lamp strip to define a distance between the lamp strip, and the first surface of the light guide plate.

9. The backlight module according to claim 8, wherein there are two support protrusions, wherein the two support protrusions are formed integral with the light guide plate; and
a recessed section for accommodating a plurality of light emitting bodies on the lamp strip is formed between the two support protrusions.

10. The backlight module according to claim 8, wherein there are two support protrusions, wherein the two support protrusions are arranged on the lamp strip and between any two light emitting bodies on the lamp strip.

11. A display device, comprising a display panel and a backlight module, wherein the backlight module comprises:
a light guide plate;
a light source assembly located on a first surface of the light guide plate;
a support bracket configured to support the light guide plate and the light source assembly, wherein:
the support bracket further comprises:
an installation portion for fixing the light source assembly; and
an elastic element arranged on the installation portion configured to adjust a gap between the light source assembly and the first surface of the light guide plate to a first distance;
wherein the support bracket further comprises a side plate with a threaded hole arranged thereon;
the installation portion comprises:
a sliding post; and
a convex plate located on one end of the sliding post;
wherein a thread is arranged on a sidewall of the convex plate to be matched with the threaded hole; and
the light source assembly comprises:
an installation base configured to fix a lamp strip;
wherein the elastic element has one end abutting against the convex plate, and the other end abutting against the installation base.

12. The display device according to claim 11, wherein an opening is arranged on the support bracket to allow the light source assembly to pass therethrough.

13. The display device according to claim 12, wherein the installation base further comprises:
a first installation plate, wherein the lamp strip is installed on one side of the first installation plate, and
an installation groove is arranged on the other side of the first installation plate to be slidably matched with the sliding post; and
a second installation plate arranged perpendicular to the first installation plate;
wherein the second installation plate is inserted into the opening, and fit onto a surface of the support bracket facing away from the light guide plate.

14. The display device according to claim 13, wherein the support bracket further comprises:
a base plate, wherein the opening is arranged on the base plate, a part of the base plate fit onto the second installation plate is bent towards a second surface of the light guide plate to form a bend area for accommodating the second installation plate, and
a surface of the second installation plate facing away from the second surface of the light guide plate is flush with a surface of an unbent part of the base plate facing away from the second surface of the light guide plate, or closer to the second surface of the light guide plate than the unbent part of the base plate.

15. The display device according to claim 14, wherein the support bracket further comprises:
a top plate arranged opposite to the base plate to absorb or reflect light rays of the lamp strip irradiated thereon.

16. The display device according to claim 11, wherein a support protrusion is arranged between the first surface of the light guide plate and the lamp strip to define a distance between the lamp strip, and the first surface of the light guide plate.

17. The display device according to claim 16, wherein there are two support protrusions, wherein the two support protrusions are formed integral with the light guide plate; and
a recessed section for accommodating a plurality of light emitting bodies on the lamp strip is formed between the two support protrusions.

18. The display device according to claim 16, wherein there are two support protrusions, wherein the two support protrusions are arranged on the lamp strip and between any two light emitting bodies on the lamp strip.

19. The backlight module according to claim 11, wherein a heat dissipation structure is arranged on the installation base.

20. The backlight module according to claim 19, wherein there is a heat conduction tape arranged between the lamp strip and the installation base.

* * * * *